(12) United States Patent
Shinba

(10) Patent No.: US 11,045,878 B2
(45) Date of Patent: Jun. 29, 2021

(54) MANUFACTURING METHOD FOR VEHICLE WHEEL

(71) Applicant: CENTRAL MOTOR WHEEL CO., LTD., Anjo (JP)

(72) Inventor: Motohiko Shinba, Okazaki (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 0 days.

(21) Appl. No.: 16/689,298

(22) Filed: Nov. 20, 2019

(65) Prior Publication Data
US 2020/0164444 A1  May 28, 2020

(30) Foreign Application Priority Data

Nov. 27, 2018 (JP) .............................. JP2018-221032

(51) Int. Cl.
*B23B 5/28* (2006.01)
*B23B 1/00* (2006.01)

(52) U.S. Cl.
CPC ............... *B23B 5/28* (2013.01); *B23B 1/00* (2013.01); *B23B 2215/08* (2013.01)

(58) Field of Classification Search
CPC ......... B23B 5/28; B23B 1/00; B23B 2215/08; B23C 3/34; B23C 2215/085; B60B 2310/226–234; B60B 2310/646; B60B 2310/656; B60B 1/06; B60B 1/08; B60B 1/10
USPC .................................................. D12/211, 209
See application file for complete search history.

(56) References Cited

FOREIGN PATENT DOCUMENTS

| EP | 3225335 A1 * | 10/2017 | ............... B23B 1/00 |
| EP | 3225335 A1 | 10/2017 | |
| JP | 2017226330 A * | 12/2017 | |
| JP | 2018-127040 A | 8/2018 | |

OTHER PUBLICATIONS

Inatani Shujiro et al. "Vehicular Wheel". Dec. 28, 2017 (Year: 2017).*
Manfred Ebetshuber et al. "Method for refining the surface of a wheel part and refined wheel part". Oct. 4, 2017 (Year: 2017).*

* cited by examiner

*Primary Examiner* — David P Bryant
*Assistant Examiner* — Nirvana Deonauth
(74) *Attorney, Agent, or Firm* — Oliff PLC

(57) ABSTRACT

A manufacturing method for a vehicle wheel includes an overlap cutting step in which lathe machining is performed on a design portion of the vehicle wheel at feed speed that allows cutting marks to be connected with each other in a radial direction with a first cutting depth from a given reference position, and a non-overlap cutting step in which, after the overlap cutting step, lathe machining is performed on the design portion at feed speed that allows cutting marks to be separated from each other in the radial direction with a second cutting depth from the reference position, the second cutting depth being deeper than the first cutting depth.

2 Claims, 17 Drawing Sheets

MANUFACTURING METHOD FOR VEHICLE WHEEL

INCORPORATION BY REFERENCE

The disclosure of Japanese Patent Application No. 2018-221032 filed on Nov. 27, 2018 including the specification, drawings and abstract is incorporated herein by reference in its entirety.

BACKGROUND

1. Technical Field

The disclosure relates to a manufacturing method for a vehicle wheel.

2. Description of Related Art

A technique has been known, the technique improving designing of a vehicle wheel made of a light alloy as machining is performed after the vehicle wheel is formed. In a vehicle wheel disclosed in Japanese Unexamined Patent Application Publication No. 2018-127040 (JP 2018-127040 A), a machined surface is formed in an outer surface of at least one of a rim part, a center bore part, and a spoke part. The machined surface includes a first machined surface and a second machined surface. The first machined surface is formed on the outer surface of each of the spoke parts on a vehicle outer side. The second machined surface is formed into a curved surface and connects the neighboring first machined surfaces with each other in a circumferential direction through radially inner sides or radially outer sides of the first machined surfaces.

SUMMARY

As described above, not only functionality such as strength and rigidity, but also designing is considered important for a vehicle wheel. Therefore, new designs for a vehicle wheel are always required. Further, it is also required to suppress an increase in manufacturing cost for producing new designs.

The disclosure has been accomplished in the view of the foregoing, and provides a manufacturing method by which it is possible to manufacture a vehicle wheel with new designing more inexpensively.

A manufacturing method according to a first aspect of the disclosure includes an overlap cutting step and a non-overlap cutting step. In the overlap cutting step, lathe machining is performed on a design portion of a vehicle wheel at feed speed that allows cutting marks to be connected with each other in a radial direction with a first cutting depth from a given reference position. In the non-overlap cutting step, after the overlap cutting step, lathe machining is performed on the design portion at feed speed that allows cutting marks to be separated from each other in the radial direction with a second cutting depth from the reference position. The second cutting depth is deeper than the first cutting depth.

In the manufacturing method according to the first aspect, a same turning tool is used both in the overlap cutting step and in the non-overlap cutting step.

A manufacturing method according to a second aspect of the disclosure includes a non-overlap cutting step and an overlap cutting step. In the non-overlap cutting step, lathe machining is performed in a design portion of a vehicle wheel at feed speed that allows cutting marks to be separated from each other in a radial direction with a second cutting depth from a given reference position. In the overlap cutting step, after the non-overlap cutting step, lathe machining is performed on the design portion at feed speed that allows cutting marks to be connected with each other in the radial direction with a first cutting depth from the reference position. The first cutting depth is shallower than the second cutting depth.

In the manufacturing method according to the second aspect, a same turning tool is used both in the overlap cutting step and in the non-overlap cutting step.

A manufacturing method according to a third aspect of the disclosure includes a first overlap cutting step and a second overlap cutting step. In the first overlap cutting step, lathe machining is performed on a design portion of a vehicle wheel at feed speed that allows cutting marks to be connected with each other in a radial direction with a second cutting depth from a given reference position. In the second overlap cutting step, after the first overlap cutting step, lathe machining is performed on the design portion at feed speed that allows cutting marks to be connected with each other in the radial direction with a first cutting depth from the reference position. The first cutting depth is shallower than the second cutting depth.

In the manufacturing method according to the third aspect, a same turning tool is used both in the first overlap cutting step and in the second overlap cutting step.

With the above-described manufacturing method for the vehicle wheel, two different kinds of cutting marks are formed, and it is thus possible to form a surface shape that is rougher and more uneven than a fine and flat surface shape made of a single kind of cutting marks and formed by conventional simple lathe machining. Moreover, it is possible to use lathe machining that has been conventionally used to manufacture a vehicle wheel. Thus, it is possible to obtain a vehicle wheel with new designing more inexpensively.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
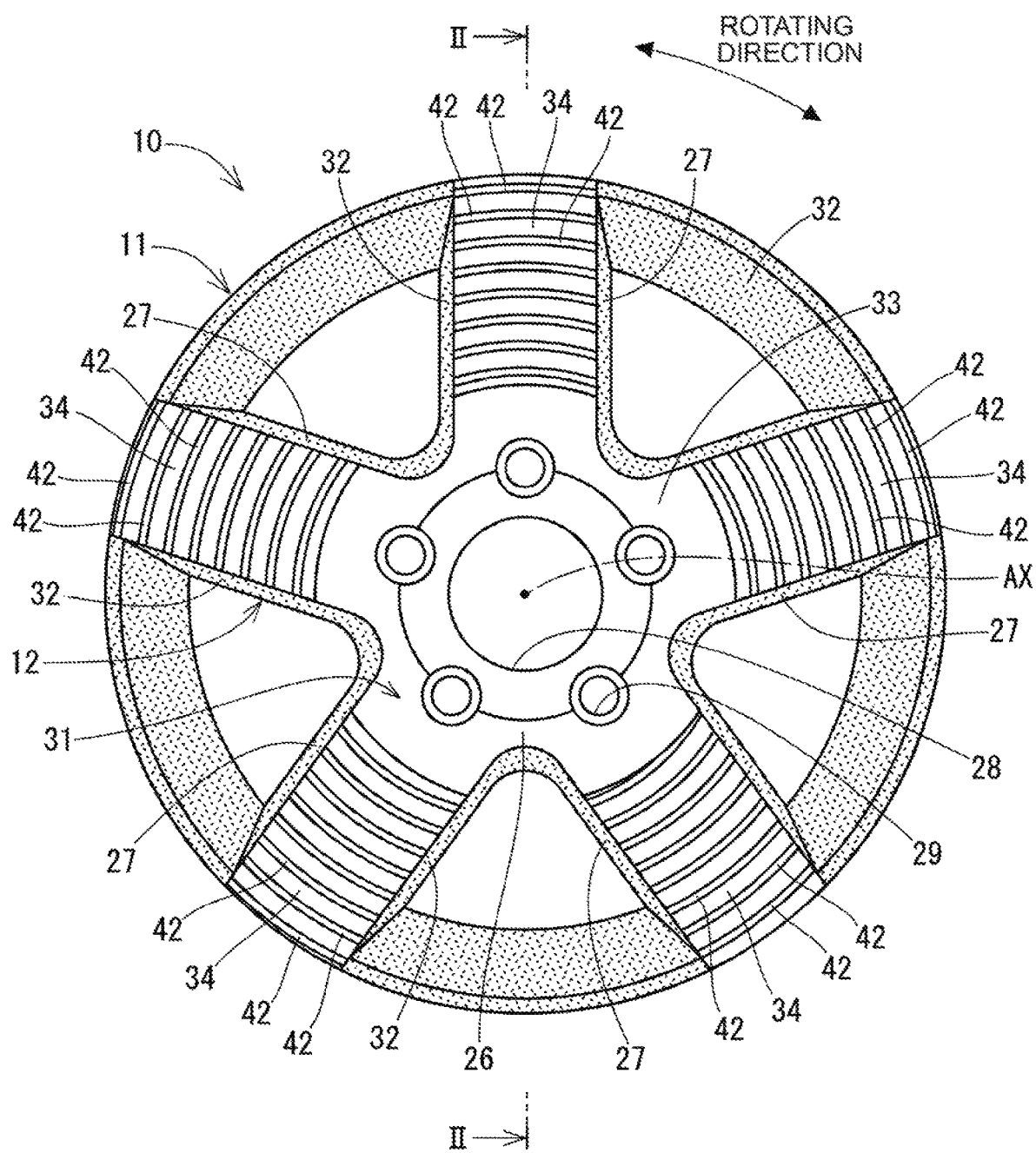
FIG. 1 is a front view of a vehicle wheel according to a first embodiment.

Hereinafter, a plurality of embodiments of the disclosure is described based on the drawings. Components that are substantially the same among the embodiments are denoted by the same reference numerals and description thereof is omitted.

Figure 2:
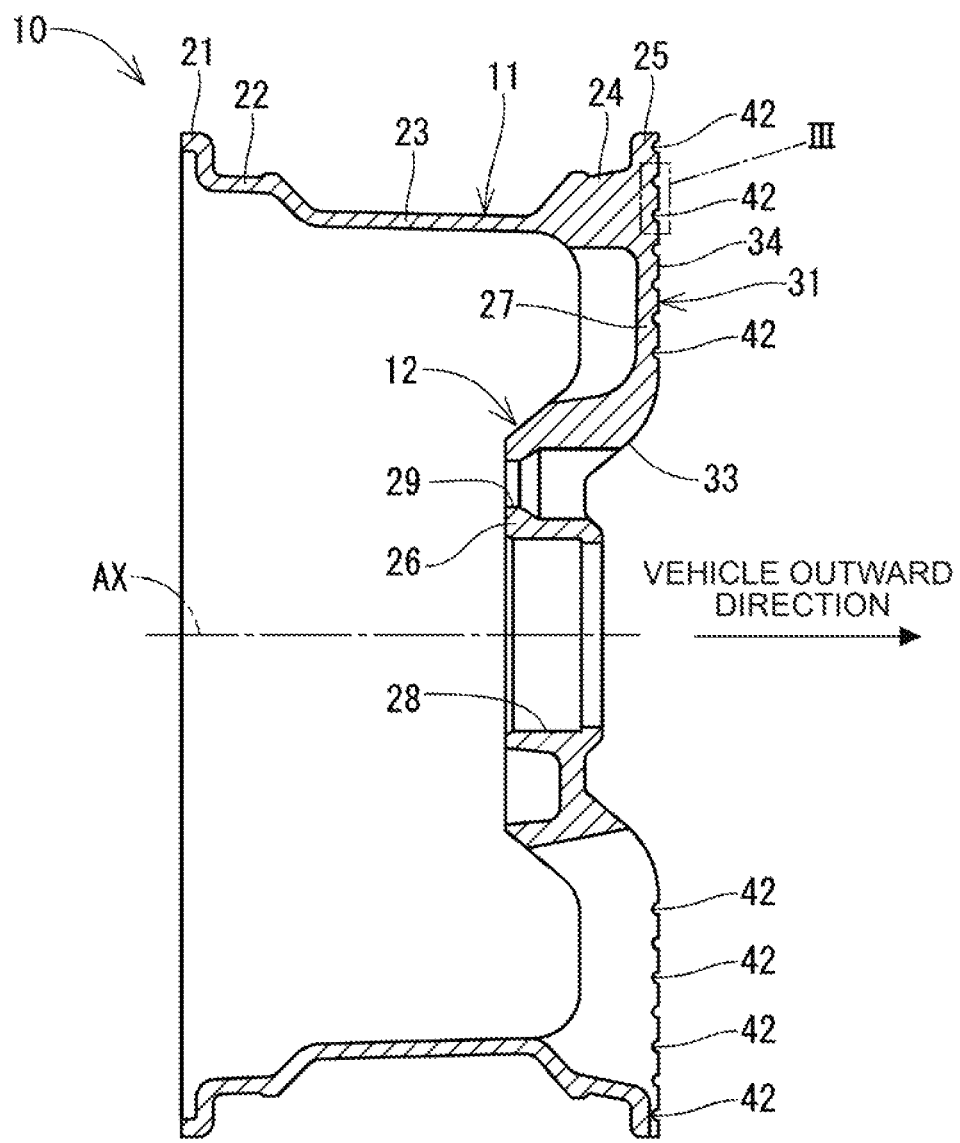
FIG. 2 is a sectional view taken along the line II-II in FIG. 1.

A vehicle wheel (hereinafter, referred to as a wheel) according to a first embodiment of the disclosure is shown in FIG. 1 and FIG. 2. The reference numeral AX shown in FIG. 1 and FIG. 2 represents an axis of rotation of the wheel 10. The right direction on the sheet of FIG. 2 is a direction from an inner side to an outer side (a vehicle outward direction) in a vehicle width direction in a state where the wheel 10 is installed on a vehicle. In the description below, a side in the vehicle outward direction is stated as a "vehicle outer side".

The wheel 10 is made of a light alloy. In this embodiment, the wheel 10 is made of an aluminum alloy, and is manufactured by, for example, casting. The wheel 10 includes a cylindrical rim part 11, and a disc part 12 provided on an inner side of the rim part 11.

The rim part 11 includes a flange portion 21, a bead seat portion 22, a well portion 23, a bead seat portion 24, and a rim flange portion 25 in this order from a vehicle inner side to the vehicle outer side. Bead portions of a tire (not shown) are mounted on the bead seat portion 22 and the bead seat portion 24, respectively, and retained by the flange portion 21 and the rim flange portion 25, respectively. The well portion 23 is a depressed portion where the bead portions enter temporarily in a process of installing the tire to the wheel 10.

The disc part 12 includes a hub-mounted part 26 that is located in a center, and a plurality of spoke parts 27 extending from the hub-mounted part 26 to the rim part 11. The hub-mounted part 26 includes a hub hole 28 and a plurality of bolt insertion holes 29 that surrounds the hub hole 28. The wheel 10 is installed to the vehicle as the hub-mounted part 26 is mounted on a hub of an axle.

A part of the wheel 10 on the vehicle outer side is a design portion, and an outer surface of the design portion is a design surface 31. The design surface 31 is a part that is visible from the vehicle outer side and is a design part that determines the look of the wheel 10. The design surface 31 includes the rim part 11 and the disc part 12. This means that the design surface 31 is made of a surface of the rim part 11 on the vehicle outer side and a surface of the disc part 12 on the vehicle outer side.

The design surface 31 includes a painted surface 32, a first cutting surface 33, and a second cutting surface 34. Clear coating with or without a color is done on the entire wheel 10. Therefore, the painted surface 32, the first cutting surface 33, and the second cutting surface 34 are visually recognized through a clear coating film. The clear coating film is not shown in any of the drawings.

The painted surface 32 is a surface that is made as its casting surface is color coated after die molding. In FIG. 1, the painted surface 32 is shown by dots. In the first embodiment, a part other than the first cutting surface 33 and the second cutting surface 34 is the painted surface 32.

The first cutting surface 33 is a flat surface that is obtained by cutting a part of the coated design portion together with the coating film. The first cutting surface 33 is a metallic bright surface and has brightness emphasized by a contrast with the painted surface 32. In this first embodiment, the first cutting surface 33 is provided in the hub-mounted part 26 on the vehicle outer side.

Figure 3:
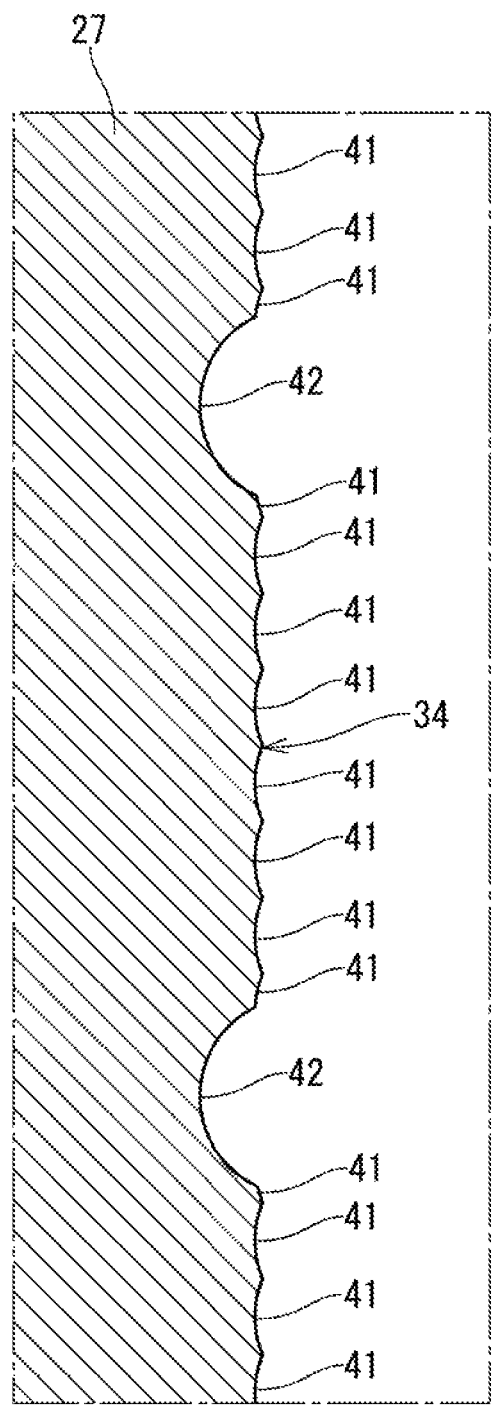
FIG. 3 is an enlarged view of a part III in FIG. 2.

As shown in FIG. 1 to FIG. 3, the second cutting surface 34 is an uneven surface that is obtained by cutting a part of the coated design portion together with the coating film. The second cutting surface 34 is a metallic bright surface and has brightness emphasized by a contrast with the painted surface 32. In the first embodiment, the second cutting surface 34 is provided in each of the spoke parts 27 on the vehicle outer side.

The second cutting surface 34 includes two kinds of cutting grooves 41, 42 extending in an almost rotating direction. In the first embodiment, the relatively shallow cutting grooves 41 and the relatively deep cutting grooves 42 are formed. The cutting grooves 41 are formed so that the cutting grooves 41 are connected with each other in a radial direction. The cutting grooves 42 are formed so that the cutting grooves 42 are separated from each other in the radial direction. More than one cutting grooves 41 are provided between the cutting grooves 42. Inner wall surfaces of the cutting grooves 41 and the cutting grooves 42 have the same curvature radius. A width of the cutting groove 41 is smaller than a width of the cutting groove 42. In FIG. 1 and FIG. 2, the cutting grooves 41 are not shown.

Figure 4:
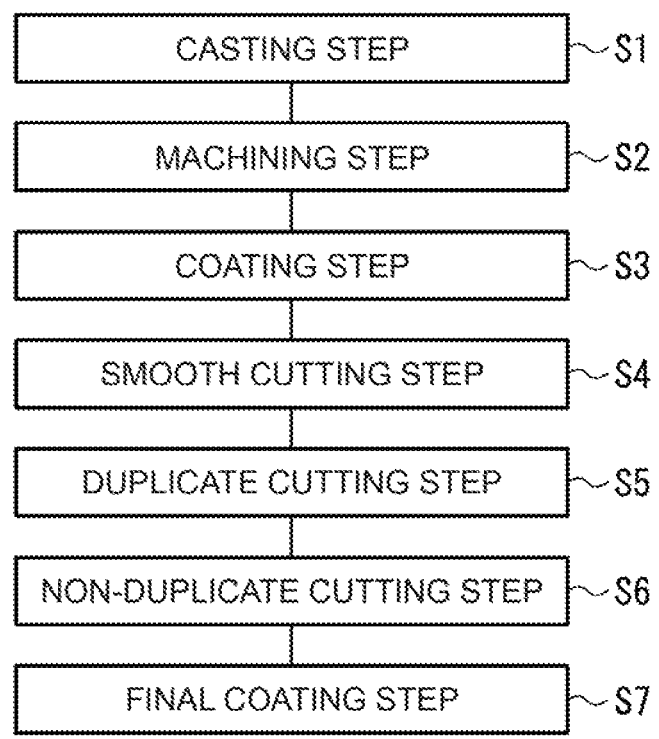
FIG. 4 is a flowchart describing manufacturing steps of the wheel according to the first embodiment.

The wheel 10 is manufactured in steps shown in FIG. 4. In casting step S1, a rough shape of the wheel 10 is formed by casting. In machining step S2, the rim part 11, the bolt insertion holes 29, and so on are formed by, for example, cutting. In coating step S3, the entire wheel 10 is coated. In smooth cutting step S4, a center portion of the coated design portion is cut together with the coating film, and the first cutting surface 33 is thus formed. In overlap cutting step S5, an outer peripheral portion of the coated design portion is cut together with the coating film, and cutting grooves 41 of the second cutting surface 34 are thus formed. In non-overlap cutting step S6, cutting is further performed after the overlap cutting step S5 (i.e., after the machining in the overlap cutting step S5), and the cutting grooves 42 of the second cutting surface 34 are thus formed. In final coating step S7, a clear coating film is applied.

Figure 5:
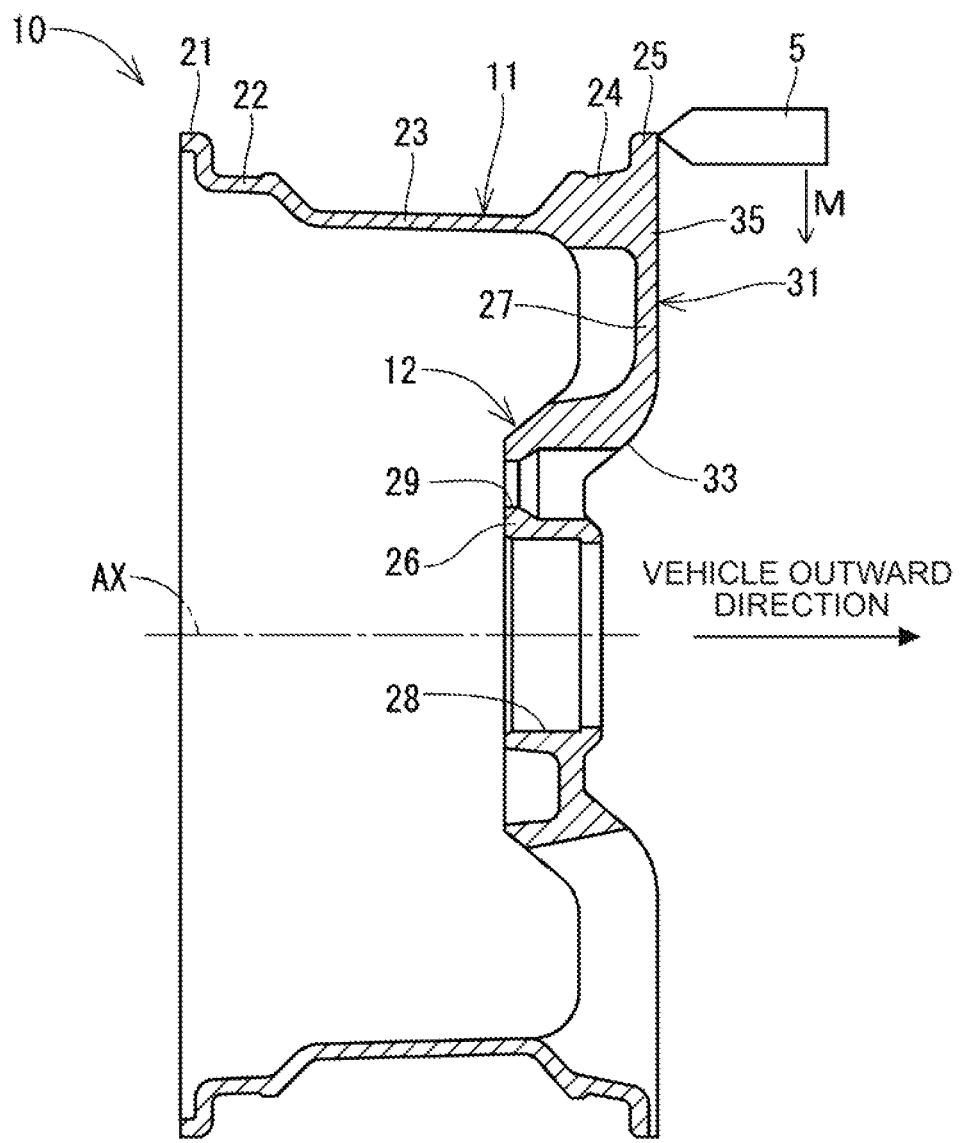
FIG. 5 is a view showing how to perform an overlap cutting step.
Figure 6:
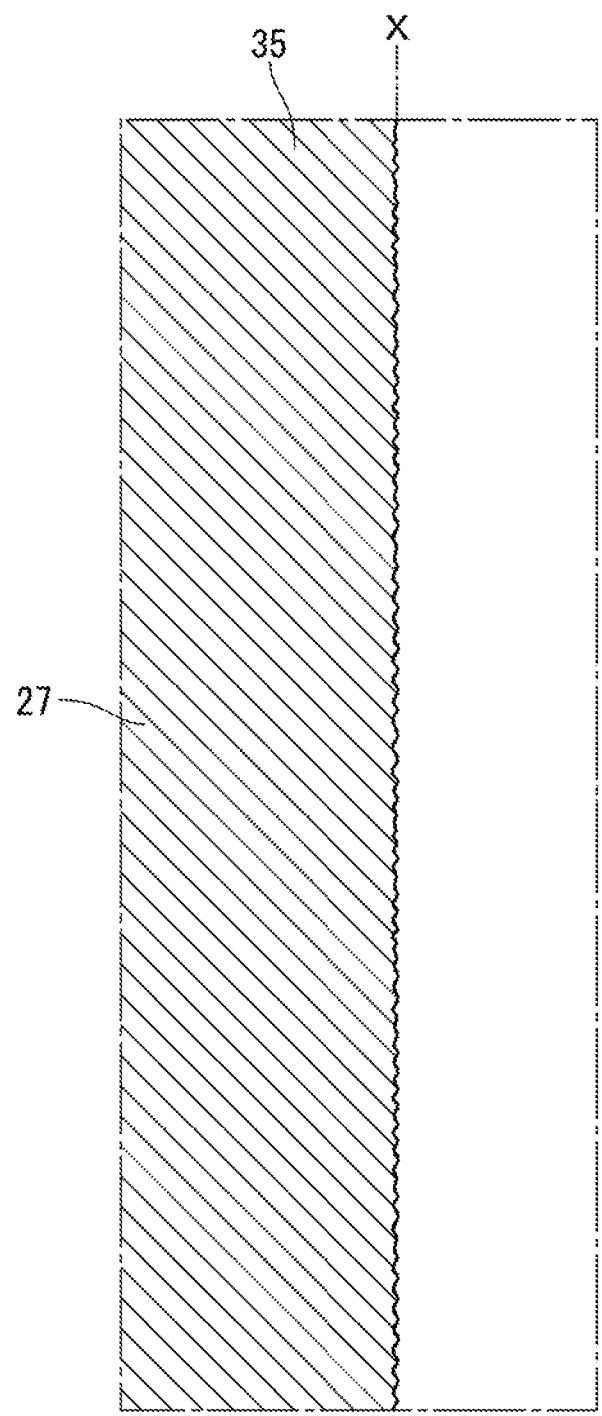
FIG. 6 is a schematic enlarged view of a design portion before the overlap cutting step.
Figure 7:
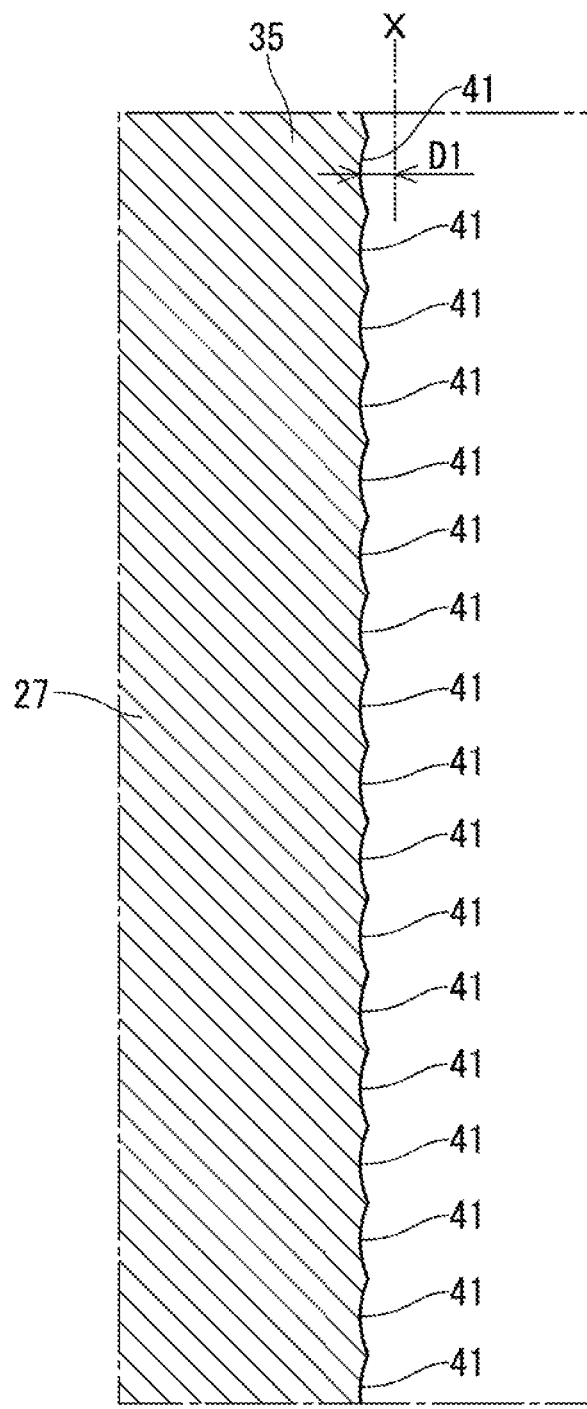
FIG. 7 is a schematic enlarged view of the design portion after the overlap cutting step.

The overlap cutting step S5 is described in detail. In the overlap cutting step S5, lathe machining is performed on a design portion 35 of the wheel 10 at feed speed that allows cutting marks (for example, the cutting grooves 41 or cutting recesses) to be connected with each other in the radial direction with a relatively shallow cutting depth D1 (a first cutting depth) from a given reference position X. As shown in FIG. 5, while the wheel 10 is being rotated, a turning tool 5 is moved in a radial direction M so as to cut the design portion 35. Thus, the cutting grooves 41 are formed in a spiral shape. Because of this, an outer surface of the design portion 35 shown in FIG. 6 before cutting becomes a cutting surface having the cutting grooves 41 that are connected with each other in the radial direction as shown in FIG. 7. As shown in FIG. 6, the reference position X almost coincides with an outer surface of the design portion 35 before cutting (a surface formed in the machining step S2). For example, the relatively shallow cutting depth D1 is set to 0.09 mm, an edge R of the turning tool 5 is set to 2 mm, and the feed speed is set to 0.4 mm/rotation. At this feed speed, the cutting marks are allowed to connect with each other in the radial direction. Since a shape of the edge of the turning tool 5 remains as the cutting marks, the curvature radius of the inner wall surface of the cutting groove 41 becomes 2 mm.

Figure 8:
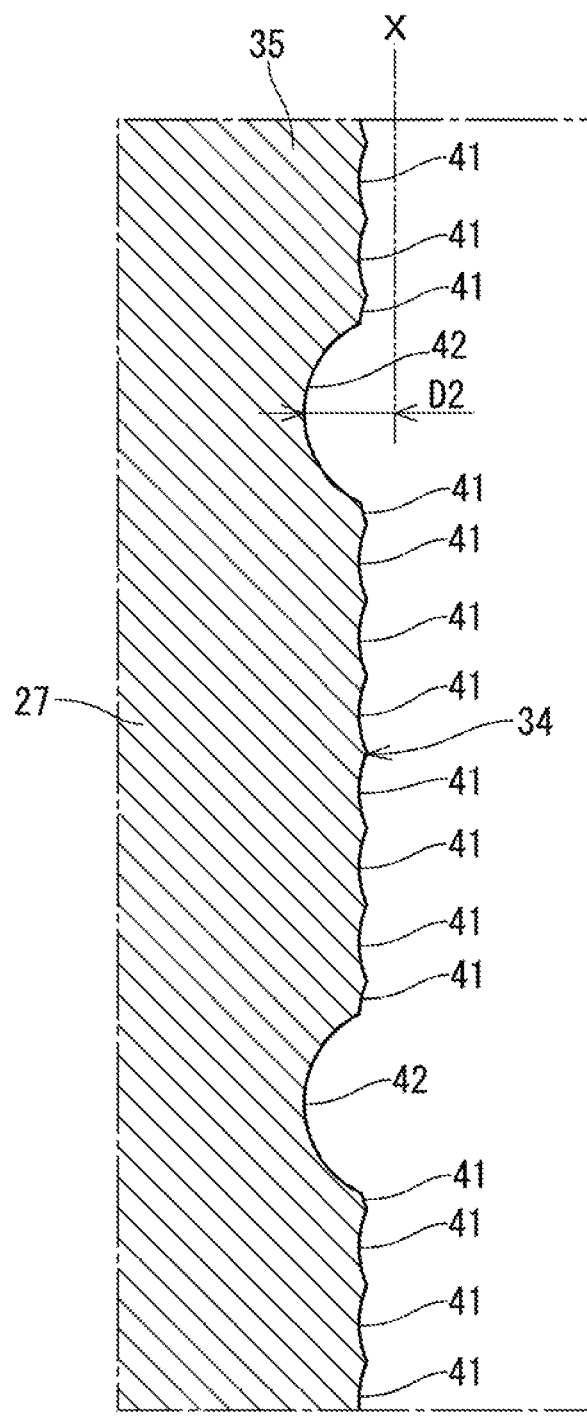
FIG. 8 is a schematic enlarged view of the design portion after a non-overlap cutting step.

The non-overlap cutting step S6 is described in detail. In the non-overlap cutting step S6, after the overlap cutting step S5, lathe machining is performed on the design portion 35 at feed speed that allows cutting marks (for example, the cutting grooves 42 or cutting recesses) to be separated from each other in the radial direction with a relatively deep cutting depth (a second cutting depth) D2 from the reference position X. Because of this, the cutting surface having the cutting grooves 41 shown in FIG. 7 becomes a cutting surface having the cutting grooves 42 separated from each other in the radial direction as shown in FIG. 8. For example, the relatively deep cutting depth D2 is set to 0.2 mm, the edge R of the turning tool 5 is set to 2 mm, and the feed speed is set to 2.8 mm/rotation. At this feed speed, the cutting marks are allowed to be separated from each other in the radial direction. Since the shape of the edge of the turning tool 5 remains as the cutting marks, the curvature radius of the inner wall surface of the cutting groove 42 becomes 2 mm.

As described so far, the manufacturing method for the wheel 10 according to the first embodiment includes the overlap cutting step and the non-overlap cutting step. In the overlap cutting step, lathe machining is performed on the design portion 35 of the wheel 10 at the feed speed that allows the cutting marks to be connected with each other in the radial direction with the relatively shallow cutting depth D1 from the given reference position X. In the non-overlap cutting step, after the overlap cutting step, lathe machining is performed on the design portion 35 at the feed speed that allows the cutting marks to be separated from each other in the radial direction with the relatively deep cutting depth D2 from the reference position X.

With the manufacturing method for the wheel 10, the cutting grooves 41, 42 are formed on the second cutting surface 34 as the two different kinds of cutting marks, respectively, and it is thus possible to form a surface shape that is rougher and more uneven than a fine and flat surface shape made of a single kind of cutting marks and obtained by conventional simple lathe machining. Moreover, it is possible to use lathe machining that has been conventionally used to manufacture a vehicle wheel. Thus, it is possible to obtain the wheel 10 with new designing more inexpensively.

Further, it is possible to use the same turning tool 5 for both the process for the cutting grooves 41 in the overlap cutting step and the process for the cutting grooves 42 in the non-overlap cutting step. Therefore, mass production becomes possible only with changes in a process program (feed speed and cutting depth).

A manufacturing method for a wheel 10 according to a second embodiment is described with reference to FIG. 9 to FIG. 12. In the second embodiment, a configuration of the wheel 10 is the same as that of the first embodiment. However, the manufacturing method for the wheel 10 is different.

Figure 9:
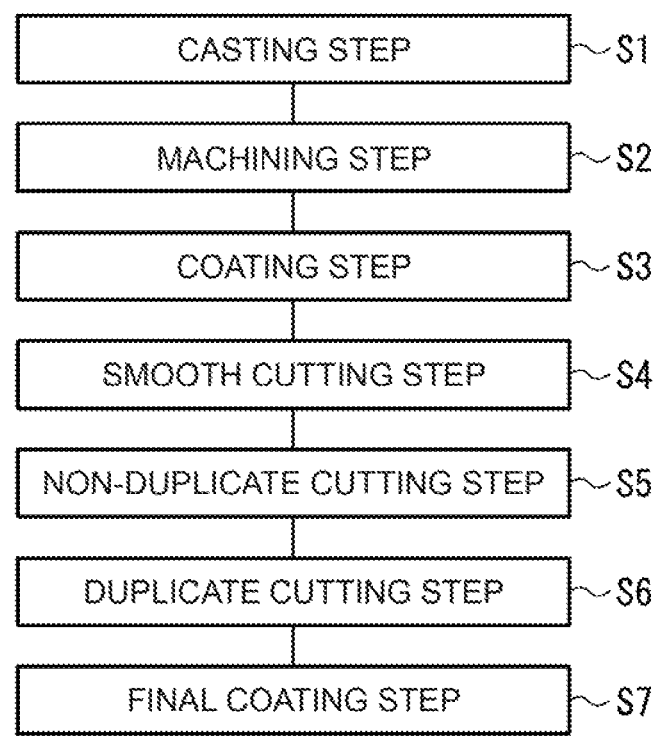
FIG. 9 is a flowchart describing manufacturing steps of a wheel according to a second embodiment.
Figure 10:
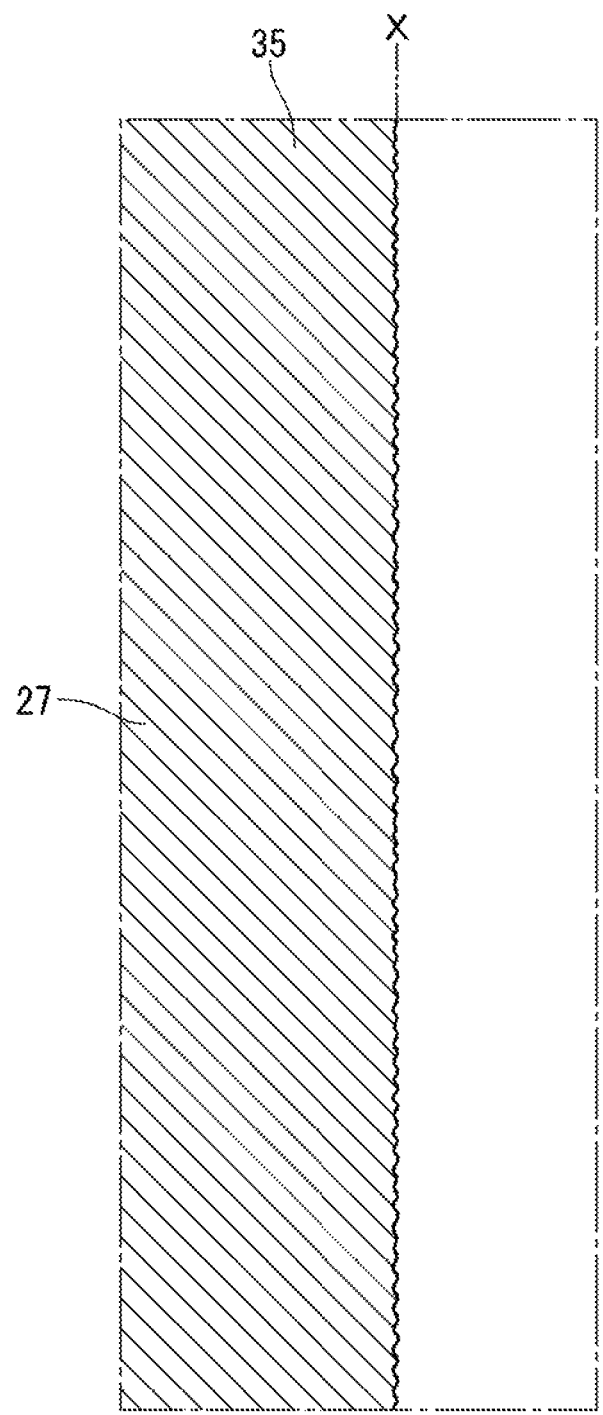
FIG. 10 is a schematic enlarged view of a design portion before a non-overlap cutting step.

The wheel 10 is manufactured through steps shown in FIG. 9. In non-overlap cutting step S5, an outer periphery of a coated design portion is cut together with a coating film, and cutting grooves 42 of a second cutting surface 34 are thus formed. After the non-overlap cutting step S5, cutting is performed further in overlap cutting step S6, and cutting grooves 41 of the second cutting surface 34 are thus formed.

Figure 11:
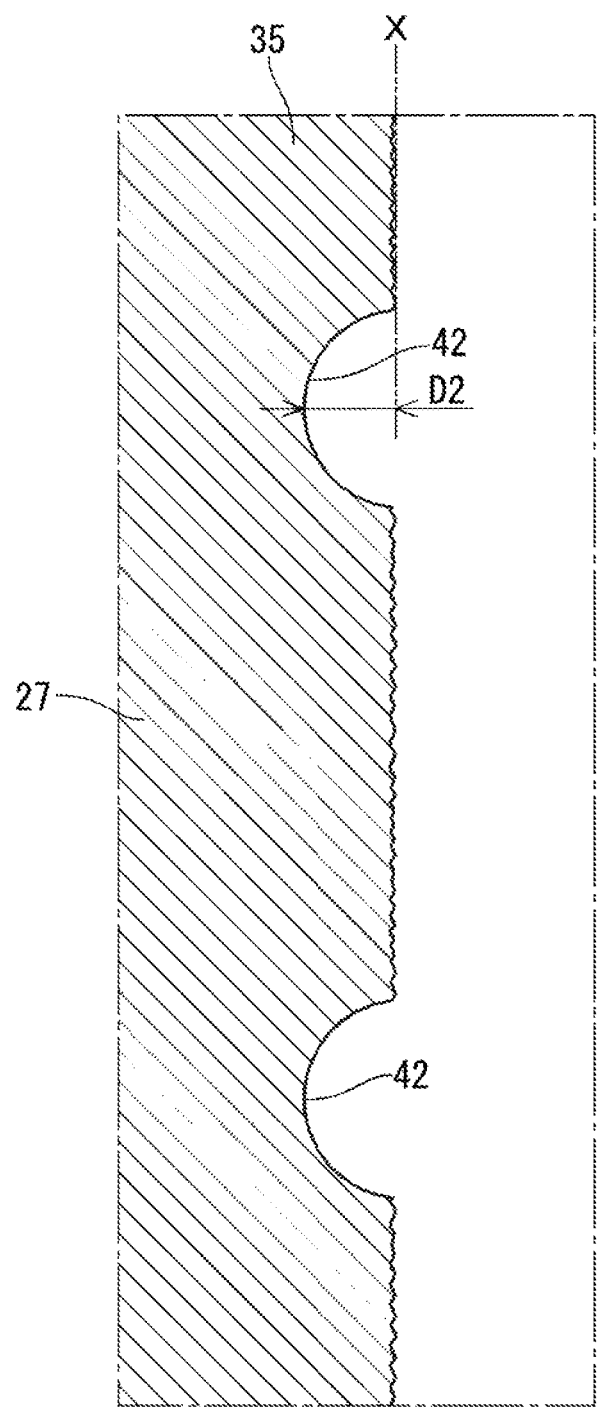
FIG. 11 is a schematic enlarged view of the design portion after the non-overlap cutting step.
Figure 12:
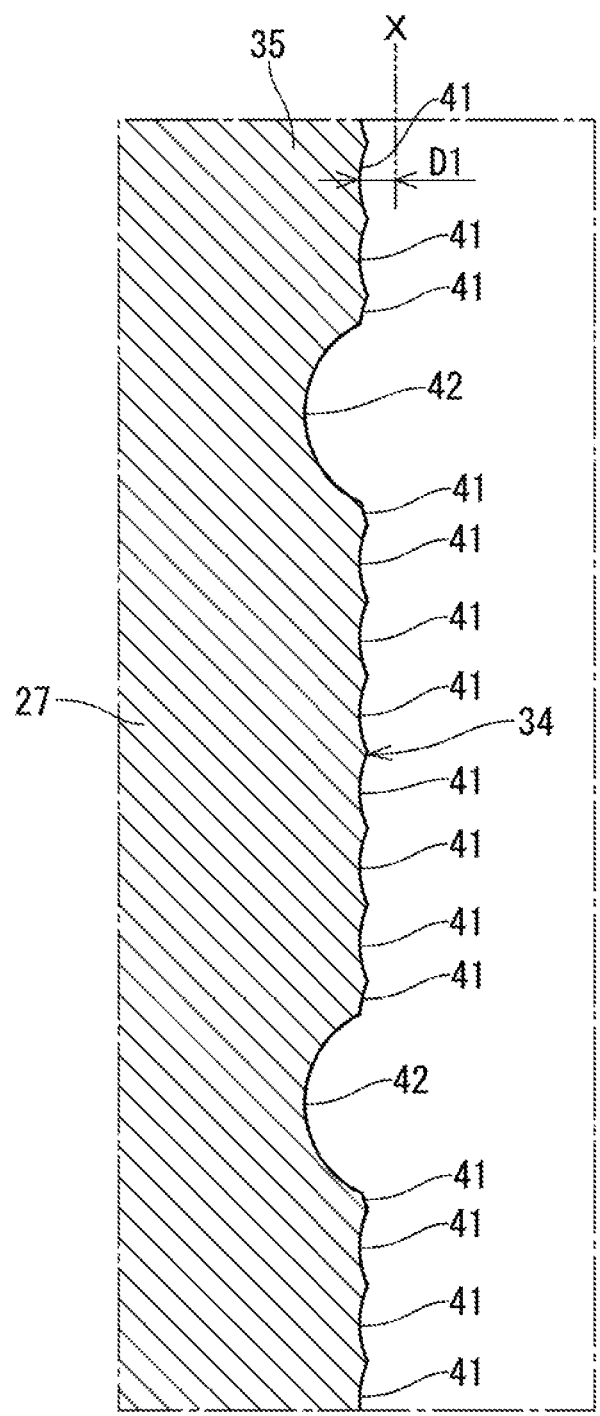
FIG. 12 is a schematic enlarged view of the design portion after an overlap cutting step.

The non-overlap cutting step S5 is described in detail. In the non-overlap cutting step S5, lathe machining is performed on a design portion 35 of the wheel 10 at feed speed that allows cutting marks (that are cutting grooves 42) to be separated from each other in a radial direction with a relatively deep cutting depth D2 from a given reference position X. Thus, an outer surface of the design portion 35 before cutting shown in FIG. 10 becomes a cutting surface having the cutting grooves 42 that are separated from each other in the radial direction as shown in FIG. 11. For example, the cutting depth D2 is set to 0.2 mm, an edge R of a turning tool 5 is set to 2 mm, and the feed speed is set to 2.8 mm/rotation. Thus, at this feed speed, the cutting marks are separated from each other in the radial direction. Since a shape of the edge of the turning tool 5 remains as the cutting marks, a curvature radius of the inner wall surface of the cutting groove 42 becomes 2 mm.

The overlap cutting step S6 is described in detail. In the overlap cutting step S6, after the non-overlap cutting step S5, lathe machining is performed on the design portion 35 at feed speed that allows cutting marks (that are the cutting grooves 41) to be connected with each other in the radial direction with a relatively shallow cutting depth D1 from the reference position X. Thus, the cutting surface having the cutting grooves 42 shown in FIG. 11 becomes a cutting surface having the cutting grooves 41 that are connected with each other in the radial direction in FIG. 12. For example, the cutting depth D1 is set to 0.09 mm, the edge R of the turning tool 5 is set to 2 mm, and the feed speed is set to 0.4 mm/rotation. Thus, at this feed speed, the cutting marks are connected with each other in the radial direction. Since the shape of the edge of the turning tool 5 remains as the cutting marks, a curvature radius of an inner wall surface of the cutting groove 41 becomes 2 mm.

As described above, the manufacturing method for the wheel 10 according to the second embodiment includes the non-overlap cutting step and the overlap cutting step. In the non-overlap cutting step, lathe machining is performed on the design portion 35 of the wheel 10 at the feed speed that allows the cutting marks to be separated from each other in the radial direction with the relatively deep cutting depth D2 from the reference position X. In the overlap cutting step, after the non-overlap cutting step, lathe machining is performed on the design portion 35 at the feed speed that allows the cutting marks to be connected with each other in the radial direction with the relatively shallow cutting depth D1 from the reference position X.

With the manufacturing method for the wheel 10 described above, the cutting grooves 41, 42 are formed on the second cutting surface 34 as the two different kinds of cutting marks, respectively. Therefore, similar effects as those of the first embodiment are obtained.

Figure 13:
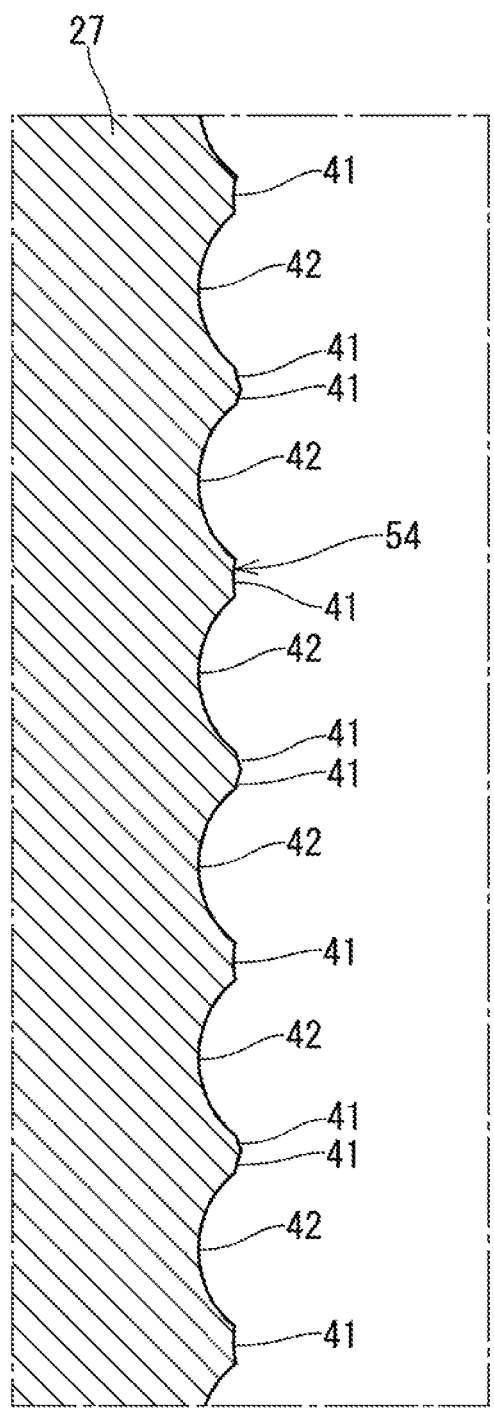
FIG. 13 is a view describing a design portion of a wheel according to a third embodiment.

As shown in FIG. 13, in a wheel 10 according to a third embodiment, an interval between cutting grooves 42 of a second cutting surface 54 is smaller than that of the first embodiment. The rest of the configuration is the same as that of the first embodiment. A manufacturing method for the wheel 10 according to the third embodiment is described based on FIG. 14 to FIG. 17.

Figure 14:
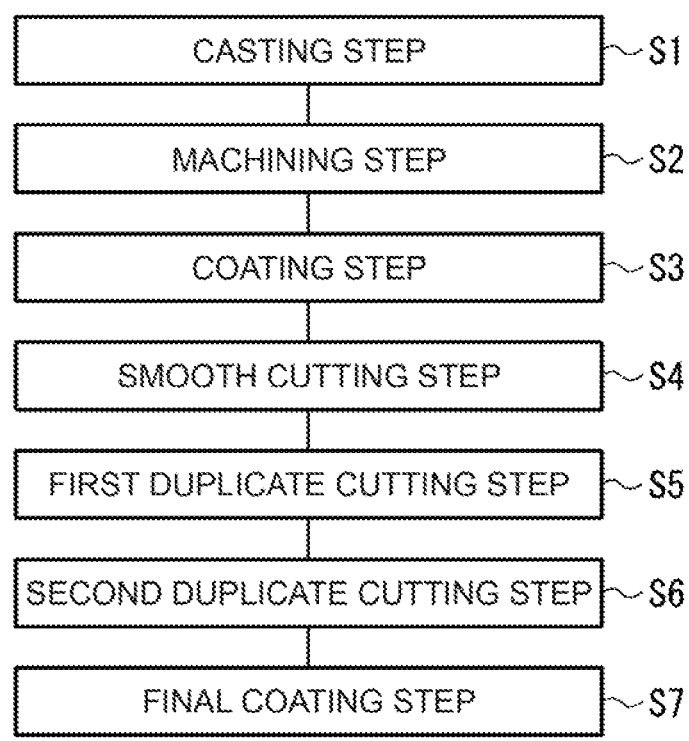
FIG. 14 is a flowchart describing manufacturing steps of the wheel according to the third embodiment.
Figure 15:
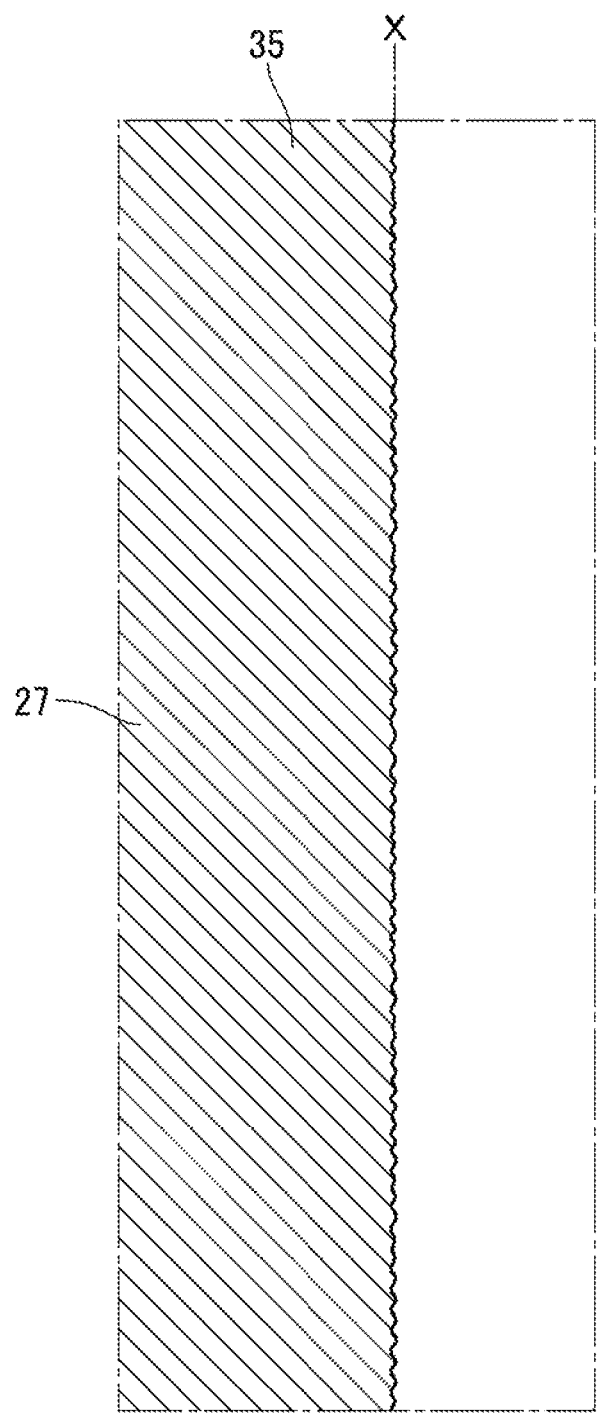
FIG. 15 is a schematic enlarged view of a design portion before a first overlap cutting step.

The wheel 10 is manufactured through steps shown in FIG. 14. In first overlap cutting step S5, an outer periphery of a coated design portion is cut together with a coating film, and the cutting grooves 42 of the second cutting surface 54 are thus formed. In second overlap cutting step S6, after the first overlap cutting step S5, cutting is performed further, and cutting grooves 41 of the second cutting surface 54 are thus formed.

Figure 16:
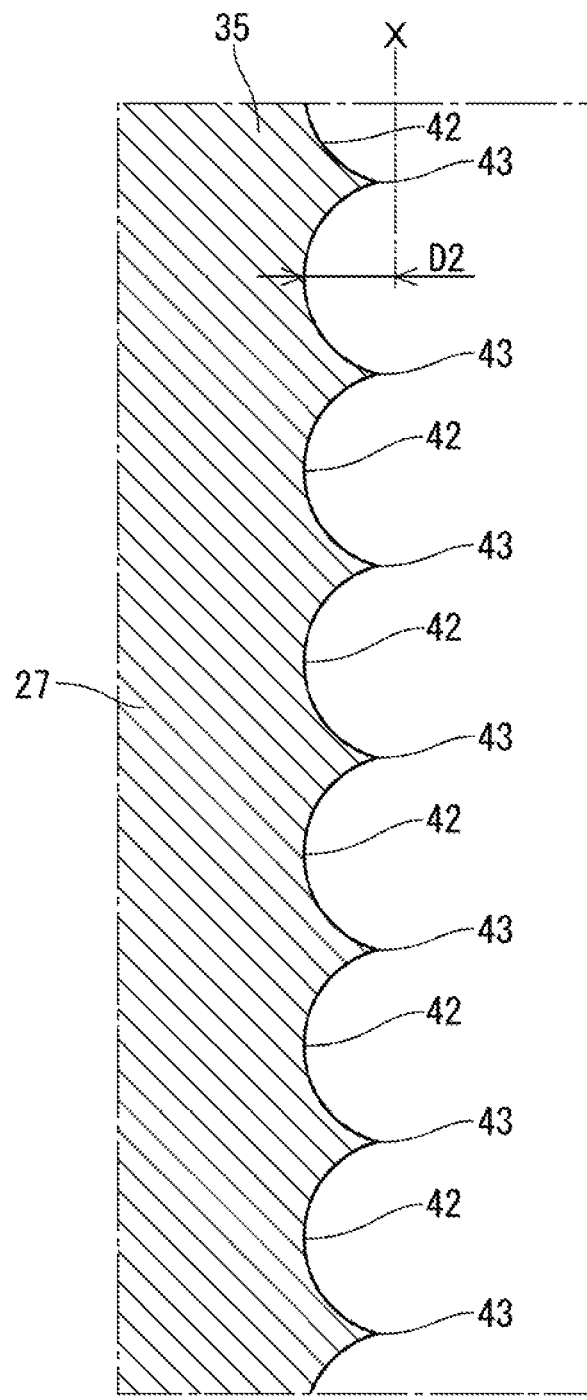
FIG. 16 is a schematic enlarged view of the design portion after the first overlap cutting step.

The first overlap cutting step S5 is described in detail. In the first overlap cutting step S5, lathe machining is performed on the design portion 35 of the wheel 10 at feed speed that allows cutting marks (that are the cutting grooves 42) to be connected with each other in the radial direction with a relatively deep cutting depth D2 from a given reference position X. Thus, an outer surface of a design portion 35 shown in FIG. 15 before cutting becomes a cutting surface having the cutting grooves 42 that are connected with each other in the radial direction as shown in FIG. 16. For example, the cutting depth D2 is set to 0.2 mm, an edge R of a turning tool 5 is set to 2 mm, and the feed speed is set to 1.5 mm/rotation. Thus, at this feed speed, the cutting marks are connected with each other in the radial direction. Since a shape of the edge of the turning tool 5 remains as the cutting marks, a curvature radius of an inner wall surface of the cutting grooves 42 becomes 2 mm.

Figure 17:
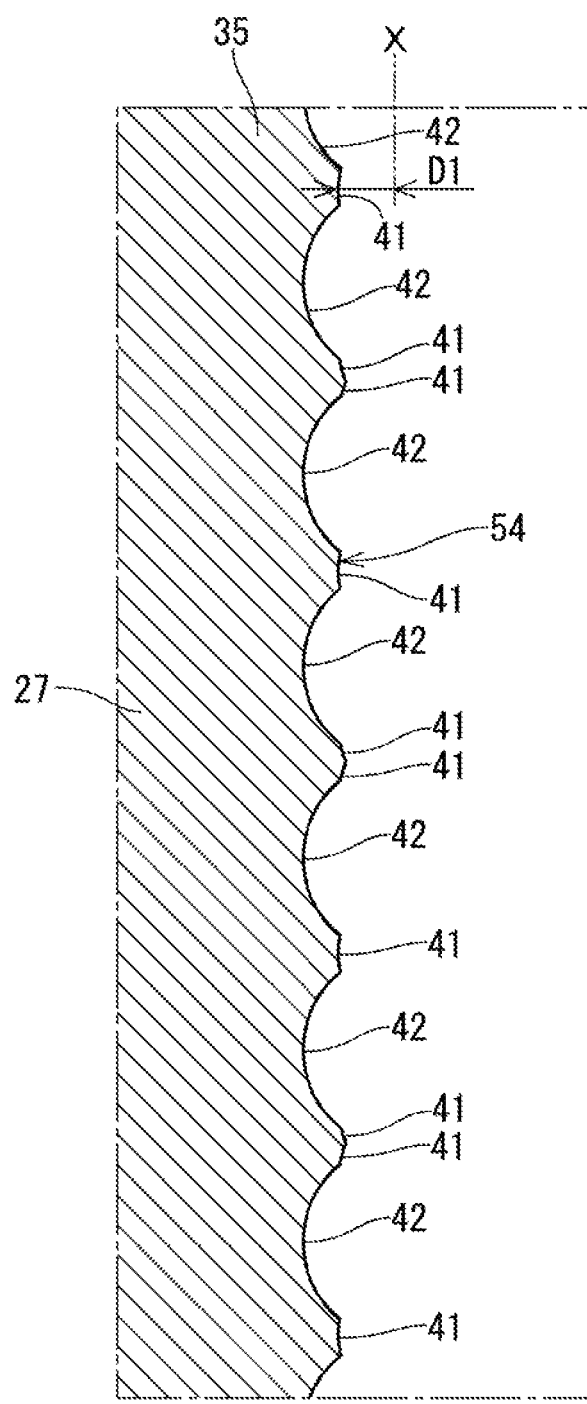
FIG. 17 is a schematic enlarged view of the design portion after a second overlap cutting step.

The second overlap cutting step S6 is described in detail. In the second overlap cutting step S6, after the first overlap cutting step S5, lathe machining is performed on the design portion 35 at feed speed that allows cutting marks (that are the cutting grooves 41) to be connected with each other in the radial direction with the relatively shallow cutting depth D1 from the reference position X. Thus, a cutting surface having the cutting grooves 42 shown in FIG. 16 becomes a cutting surface having the cutting grooves 41 that are connected with each other in the radial direction as shown in FIG. 17. In this embodiment, since the interval between the cutting grooves 42 is narrow, the number of the cutting grooves 41 formed between the cutting grooves 42 is one or two. For example, the cutting depth D1 is set to 0.09 mm, the edge R of the turning tool 5 is set to 2 mm, and the feed speed is set to 0.4 mm/rotation. Thus, at this feed speed, the cutting marks are connected with each other in the radial direction. Since the shape of the edge of the turning tool 5 remains as the cutting marks, a curvature radius of the inner wall surface of the cutting groove 41 becomes 2 mm.

As described above, the manufacturing method for the wheel 10 according to the third embodiment includes the first overlap cutting step and the second overlap cutting step. In the first overlap cutting step, lathe machining is performed on the design portion 35 of the wheel 10 at the feed speed that allows the cutting marks to be connected with each other in the radial direction with the relatively deep cutting depth D2 from the reference position X. In the second Overlap cutting step, after the first overlap cutting step, lathe machining is performed on the design portion 35 at the feed speed that allows the cutting marks to be connected with each other in the radial direction with the relatively shallow cutting depth D1 from the reference position X.

With the manufacturing method for the wheel 10, the cutting grooves 41, 42 are formed on the second cutting surface 54 as the two different kinds of cutting marks, respectively. Therefore, similar effects as those of the first embodiment are obtained.

Further, after the cutting in the first overlap cutting step, a pointed part 43 is formed between the cutting grooves 42. However, as the second overlap cutting step is carried out, the pointed part 43 is cut and made into the cutting groove 41. Therefore, a clear coating film applied in a final coating step S7 is restrained from becoming thin in the pointed part 43, and rust of the wheel 10 is thus prevented.

In the first to third embodiments, the second cutting surfaces 34, 54 are uneven surfaces obtained by partially cutting the coated design portion together with the coating film. In another embodiment, the second cutting surface may be an uneven surface that is obtained by cutting a part of a design portion before coating, and then coating is done thereafter.

The same turning tool 5 is used for the two cutting steps for forming the cutting grooves (that are the overlap cutting step and the non-overlap cutting step in the first embodiment, the non-overlap cutting step and the overlap cutting step in the second embodiment, and the first overlap cutting step and the second overlap cutting step in the third embodiment). However, in another embodiment, different turning tools may be used.

In another embodiment, a material of the wheel is not limited to an aluminum alloy, and may be a different light alloy such as magnesium alloy. Further, in another embodiment, the wheel may be manufactured not only by casting, but also by forging. Furthermore, in another embodiment, the disc part is not limited to the spoke type, and may be another type such as a mesh type.

As described so far, the disclosure is not limited to these embodiments and can be carried out in various forms without departing from the scope of the disclosure.

What is claimed is:

1. A manufacturing method for a vehicle wheel, the manufacturing method comprising:
    an overlap cutting step in which lathe machining is performed on a design portion of the vehicle wheel at feed speed that allows cutting marks to be connected with each other in a radial direction with a first cutting depth from a given reference position; and
    a non-overlap cutting step in which, after the overlap cutting step, lathe machining is performed on the design portion at feed speed that allows cutting marks to be separated from each other in the radial direction with a second cutting depth from the reference position, the second cutting depth being deeper than the first cutting depth.

2. The manufacturing method for the vehicle wheel according to claim 1, wherein:
    a same turning tool is used both in the overlap cutting step and in the non-overlap cutting step.

* * * * *